Dec. 20, 1955 J. F. CHVOSTA 2,727,552
SHEET METAL RETAINER FOR THREADED FASTENERS
Filed March 12, 1953

INVENTOR
JERRY F. CHVOSTA

BY *H. S. Lombard*
ATTORNEY

United States Patent Office 2,727,552
Patented Dec. 20, 1955

2,727,552

SHEET METAL RETAINER FOR THREADED FASTENERS

Jerry F. Chvosta, Cleveland, Ohio, assignor to Tinnerman Products, Inc., Cleveland, Ohio, a corporation of Ohio Application March 12, 1953, Serial No. 341,963

3 Claims. (Cl. 151—41.75)

This invention relates in general to bolt and nut fastened installations and deals, more particularly, with improvements in fastening devices for attaching nuts, tapped plates, and the like, in fastening position in an assembly prior to the application of a cooperating fastening device thereto for securing the parts of the assembly.

In many assemblies, it is necessary or desirable to use a standard nut and bolt fastening means but it is usually a difficult problem, especially in blind locations, for the operator to hold the bolt or nut in place as the cooperating fastener is applied, or otherwise, to maintain the same against relative rotation during the final tightening of the fasteners. In such an assembly in which the rearward side of a part is not conveniently or readily accessible for holding a bolt or nut in fastening position prior to the application of the cooperating fastener, it has been the practice to resort to various forms of cage devices requiring a welding or riveting operation for attaching the same in providing means for holding the nut or bolt in fastening position. A welding or riveting operation involves considerably increased costs in manufacture which often make the use of this type of holder prohibitive in many installations requiring a cheap and inexpensive fastening means. Welded or riveted holders otherwise are objectionable by reason of the inordinate amount of time required in the installation thereof and the lack of any provision for shifting of the bolt or nut in attached position to compensate for misalignment of the openings in the parts secured.

In United States Patent Number 2,391,046 issued December 18, 1945, there is disclosed a general form of nut holder which is installed in attached position on a support by an easy clip or snap fastening procedure that is much quicker and considerably cheaper than that involved in the use of the aforementioned cage devices requiring a costly and time consuming riveting or welding operation. In the use of nut holders constructed in accordance with this patent, it has been found in applications wherein a power driver is employed to apply a bolt into a previously attached nut, that the impact of the power driver in the initial application of the bolt to the nut occasionally causes a displacement of the nut and nut holder from proper attached position. In accordance with the present invention, such nut holders, and the like, are so constructed as to be positively retained in attached position under a pronounced spring load and thereby adapted to withstand such impact of a power driver or other force that might have a tendency to displace the nut and nut holder from proper and effective attached position.

A primary object of this invention, therefore, is to provide a holder or retainer for a nut, or other clamping member, which comprises clip or snap fastened attaching means in the form of spring arms or hooks which are received in a work opening in the attached position of the holder, and which are positively retained in such attached position under a pronounced spring load that prevents removal or displacement of said spring arms or hooks from attached position in the work opening.

A further object of the invention is to provide such a nut holder, or the like, in which the attaching arms or hooks extend completely free from the body of the holder for easy and quick application to attached position by a simple clip or snap fastening action, and which are positively retained in such attached position by spring elements in the form of spring fingers, or the like, adapted to exert a pronounced spring load on said arms or hooks that prevents removal or displacement of said arms or hooks from attached position in a work opening.

Another object of the invention is to provide a nut holder, or the like, of this character which allows for shifting or adjustment of the attached nut or other fastener as necessary to compensate for misalignment of the bolt openings in the parts secured.

Further objects and advantages, and other new and useful features in the construction, arrangement and general combination of elements of the improved holder or retainer of the invention will be readily apparent as the following description proceeds with reference to the accompanying drawings, for purposes of illustration but not of limitation, in which like reference characters designate like parts throughout, and in which.

Figure 1:
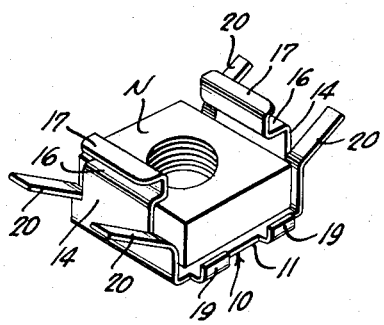
Fig. 1 is a perspective view showing an assembled nut and nut holder in accordance with the invention as seen from the underside thereof; and, Fig. 2 is a sectional view showing the nut and nut holder of Fig. 1 as attached in a panel opening in a part preparatory to the application of a cooperating bolt to secure said part to an associated part.
Figure 2:
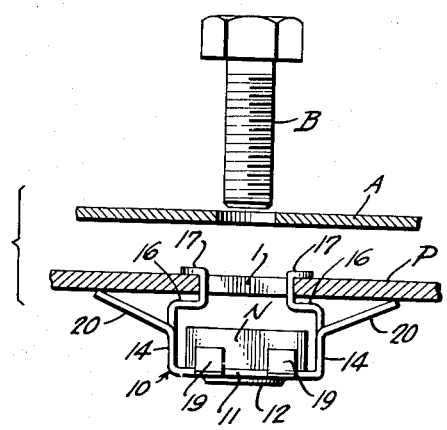

Referring now, more particularly, to the drawings, Figs. 1 and 2 show a form of fastener 10 in accordance with the invention as provided for use as a holder or retainer for a nut N. The fastener 10 is constructed from a sheet metal section of a size and configuration determined by the shape and size of the nut N with which it is to be used and may be readily provided for use with any other kind of nut or equivalent work clamping member such as the head of a bolt.

In the present example, the holder 10 is shown as constructed for use with a standard square threaded nut N to be attached in fastening position over a generally rectangular opening 1 in a supporting part such as a panel or plate P. The nut holder 10 may be readily constructed for attachment in a circular hole or other opening of any selected design but the use of generally rectangular opening, as shown, is advantageous in that it is relatively simple to form and otherwise provides for a fixed nonrotative attachment of the nut holder in attached position. Any suitable sheet metal may be employed in providing the nut holder 10, but preferably that of a spring metal nature such as spring steel or cold rolled steel having spring-like characteristics.

The sheet metal blank forming the nut holder 10 is bent to define a central body portion 11 having an enlarged bolt passage 12 and end portions extending in the same general direction to form a pair of spring arms 14 having opposing wall portions disposed in slightly outwardly inclined relation when normally untensioned. Said spring arms 14 have the free end portions thereof provided in a reduced width slightly less than the width of the panel opening 1, and said free end portions of reduced width are formed to provide inwardly bent flanges 16 together with return bent outwardly extending tongues or hook elements 17, or the like, which in normal untensioned relation, are spaced apart a distance greater than the width of the panel opening 1. The said hook elements 17, otherwise, are preferably provided in a predetermined spacing from the inward flanges 16 corresponding substantially to the thickness of the panel P adjacent the panel opening 1 so as to clasp the opposite surfaces of marginal portions of said panel opening 1 in snug frictional engagement therewith. The spring arms 14 extend from the central body portion 11 in entirely free and independent relation so that they may be readily flexed as necessary for an easy and quick attachment of the hooks 17 with the marginal edges of said panel opening 1. At the sides of the nut holder 10, one or two tabs or lugs 19 are bent to extend downwardly from the side edges of the central body portion 11.

The general form of nut holder 10, accordingly, comprises a cage-like structure in which the nut N is retained by the opposing walls of the spring arms 14 at the ends of the nut holder and the tabs or lugs 19 along the sides of the nut holder. The nut holder 10 is constructed to conform generally to the shape of the nut N but in a somewhat larger size to provide for a floating mounting of the nut within the nut holder. The arrangement, otherwise, is such that the spring arms 14 may be spread apart as necessary to slip the nut N through the space between the hooks 17 on the ends thereof to a position in which the holder retains the nut in the manner of a cage device defined by said spring arms 14 and the tabs or lugs 19, as aforesaid. The nut N, as thus retained by the nut holder of relatively larger size, has its threaded opening in line with the enlarged bolt passage 12 in the central body 11 of the holder and is capable of considerable shifting or adjustment within the nut holder as necessary to compensate for misalignment or other irregularities in the bolt openings in the parts to be secured.

Each of the spring arms 14 is provided with one or more spring fingers 20 adapted to provide a spring load on the hooks 17 in attached position in the panel opening 1 in a manner which prevents displacement or removal of said hooks 17 from attached position in said panel opening 1. In the form of the invention shown in Figs. 1 and 2, said spring fingers 20 are provided by partially severed strips along the edges of the spring arms 14 at opposite sides of each of said hooks 17. The said fingers 20 may be provided in various forms and, in the present example, are shown provided similarly to flat leaf springs which extend outwardly in inclined diverging relation from the spring arms 14. The spring fingers 20 in any form are of such length as to extend beyond the hooks 17 carried by said spring arms 14 when normally untensioned, but capable of yielding as necessary for the extremities of said spring arms to lie slightly below the hooks 17 in attached position in the panel opening 1, as shown in Fig. 2.

The assembled nut and nut holder thus provided is easily and quickly attached in the panel opening 1 simply by compressing the outwardly inclined opposing wall portions of the spring arms 14 to move the hooks 17 on the ends thereof inwardly toward each other. In this relation, the hooks 17 still have their extremities farther apart than the width of the panel opening 1. Accordingly, in attaching the nut holder, one hook 17 is passed through the opening 1 with the other hook 17 resting on the face of the panel adjacent the opening. The clearance between the nut and the spring arms 14 enables the latter hook 17 to be pressed inwardly and sprung sufficiently so that it may also pass through the opening 1 and thus be received in said opening. The spring arms 14 are then released from their compressed condition and in attempting to assume their normal outwardly inclined relation, both hooks 17 are forced to spread apart and thereby frictionally and grippingly engage the adjacent marginal edges of the panel opening, as shown in Fig. 2. The spring arms 14, as thus attached, do not assume their normal untensioned relation but rather, remain biased slightly inwardly in the engaged position of the hooks 17 in the panel opening 1, as illustrated in Fig. 2. The attachment of the hooks 17 on the spring arms 14 is effected entirely by spring action and without need for tools for mechanical bending of said hooks 17.

As the hooks 17 are thus applied to attached position in the panel opening 1, the extremities of the outwardly diverging spring fingers 20 bear upon the adjacent surface of the panel P and cause said spring fingers 20 to yield and flex outwardly such that said spring arms 14 are highly tensioned in the attached position of said hooks 17 in said panel opening 1. The action is such that said tensioned spring fingers 20 exert a pronounced outwardly directed spring force or spring load on each of said spring arms 14 tending to urge said spring arms 14 outwardly in opposite directions. This outward spring force, accordingly, is transmitted to the outwardly extending hooks 17 carried by said spring arms 14 which causes said hooks 17 to bear against the engaged marginal portions of the panel opening 1 under the continuously effective spring load provided by said tensioned spring fingers 20 to positively retain said hooks 17 against displacement or removal from secured relation in said panel opening 1 in the fully attached position of the nut holder 10 on the panel P substantially as shown in Fig. 2.

It will be appreciated that in the described attachment of the nut holder 10, the spring arms 14 and spring elements 20 are sufficiently flexible and pliable that the nut holder may be readily manipulated solely by the fingers of a worker as necessary to attach the nut holder easily and quickly and without the use of tools, thereby providing highly important advantages in assembly line mass production methods of manufacture.

In the fully attached position of the nut holder, the inwardly bent flanges 16 hold the nut N slightly out of contact with the panel P and accordingly, when the associated bolt B is applied and tightened in securing a cooperating part A to said panel P, the nut N is drawn against said inwardly bent flanges 16 to flatten and tension the same. The spring force thus set up in said inwardly bent flanges 16 tends to urge the nut N outwardly from the panel P in a manner which causes a frictional binding between the nut threads and the threads on the bolt B to produce an effective thread locking action on the bolt that resists loosening thereof from tightened fastening position.

The improved holder 10 is equally applicable as a retainer for a bolt or other work clamping fastener having a head approximating the size and proportions of the nut N with which the holder is used as disclosed with reference to Figs. 1 and 2. The head of such a bolt is readily assembled in the holder 10 and this assembly positioned over the panel opening 1 with the shank of the bolt projecting through said panel opening, whereupon the holder or retainer is secured in attached relation in said panel opening in the same general procedure described in which the spring arms 14 are manipulated to engage the hooks 17 with marginal portions of said panel opening 1 and said hooks retained in such attached position under the spring load provided by the tensioned spring finger 20.

Figure 3:
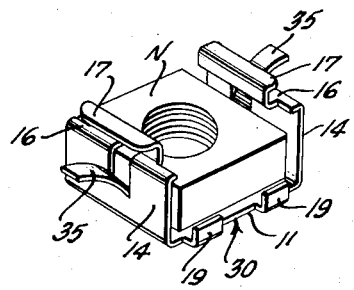
Fig. 3 is a perspective view showing another form of assembled nut and nut holder in accordance with the invention; and, Fig. 4 is a sectional view showing the nut and nut holder of Fig. 3 as attached in a panel opening in a part in position for the application of a bolt to secure said part in an assembly.
Figure 4:
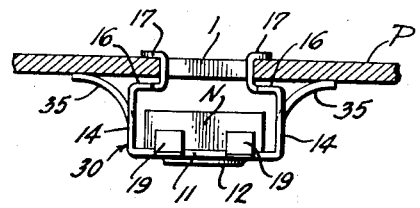

Figs. 3 and 4 show another embodiment of the invention wherein the holder or retainer 30 is formed with the spring fingers 35 in an alternate construction adapted to provide a spring load on the tongues or hooks 17 to retain the same in attached position in the panel opening 1. The holder or retainer 30 has the same general construction, application and use as that described with reference to Figs. 1 and 2 and includes a pair of similar spring arms 14 provided with the inwardly bent flanges 16 and outwardly extending hooks or tongues 17. The spring fingers 35 are provided by partially severed strips in the intermediate portions of said spring arms 14 and the adjoining inwardly bent flanges 16 such that said spring fingers 35 extend from substantially the central areas of said spring arms 14 and project outwardly therefrom in diverging relation. Said spring fingers 35 preferably are curved in their outwardly diverging relation substantially as shown in Figs. 3 and 4 with the free ends thereof extending beyond the hooks 17 in normal untensioned relation. The spring fingers 35, thus provided, are adapted to be tensioned in the attached position of the nut holder 30, Fig. 4, substantially as described with reference to the embodiment of Figs. 1 and 2, in a manner whereby said spring fingers 35 provide a pronounced outward spring force or spring load on the outwardly extending hooks 17 carried by the spring arms 14 to positively retain said hooks 17 against displacement or removal from secured relation in the panel opening 1 in the fully attached position of the nut holder on the panel P.

A holder or retainer in accordance with the invention preferably is constructed of relatively thin sheet metal the thickness of which is selected according to service requirements and the predetermined size of the parts to be secured. The holder or retainer is most effective when provided of spring metal suitably tempered and otherwise treated to give the desired toughness and hardness, particularly in the case of devices intended for use in heavy duty applications. A cheap and highly satisfactory holder or retainer in accordance with the invention may be provided from cold rolled metal such as cold rolled steel which is untempered but of a spring metal nature and capable of providing an effective, reliable fastening device as and for the purposes described.

While the invention has been described in detail with specific examples, such examples are intended as illustrations only inasmuch as the invention fully contemplates various modifications which may be provided without departing from the spirit and scope of the invention.

What is claimed is:
1. A fastening device comprising a clamping member such as a nut or bolt head and a cage comprising a piece of sheet metal bent to define a base overlying the top of said clamping member, means on the sides of said base in abutting relation to opposite side faces of said clamping member, a pair of arms extending from the ends of said base in the same general direction in abutting relation to opposite end faces of said clamping member, inturned flanges extending from said arms under the bottom of said clamping member and carrying outwardly directed hooks for attaching the fastening device in an opening in a supporting part with said inturned flanges positioned against the outer surface of said supporting part, said arms being provided with lengthwise partially severed strips defining spring fingers integral at one end with said arms between said base and inturned flanges and having outwardly diverging free ends of such length as to project materially beyond said inturned flanges when said spring fingers are untensioned, whereby said free ends of said spring fingers are adapted for tensioned engagement with said outer surface of said supporting part in the attached position of the fastening device thereon to provide an outward spring force on said arms tending to expand said arms and thereby retain said outwardly directed hooks in attached position in said opening in the supporting part.

2. A fastening device in accordance with claim 1 in which said arms of said cage are so provided with said lengthwise partially severed strips as to define a spring finger at each side of each of said outwardly directed hooks.

3. A fastening device in accordance with claim 1 in which said arms of said cage are so provided with said lengthwise partially severed strips as to define a spring finger extending from an intermediate portion of each of said arms.

References Cited in the file of this patent
UNITED STATES PATENTS

| | | |
|---|---|---|
| 2,495,037 | Tinnerman | Jan. 17, 1950 |
| 2,560,961 | Knohl | July 17, 1951 |
| 2,587,134 | Flora | Feb. 26, 1952 |
| 2,616,142 | Tinnerman | Nov. 4, 1952 |